(No Model.)
M. C. ARMOUR.
BROILER.
No. 403,407. Patented May 14, 1889.
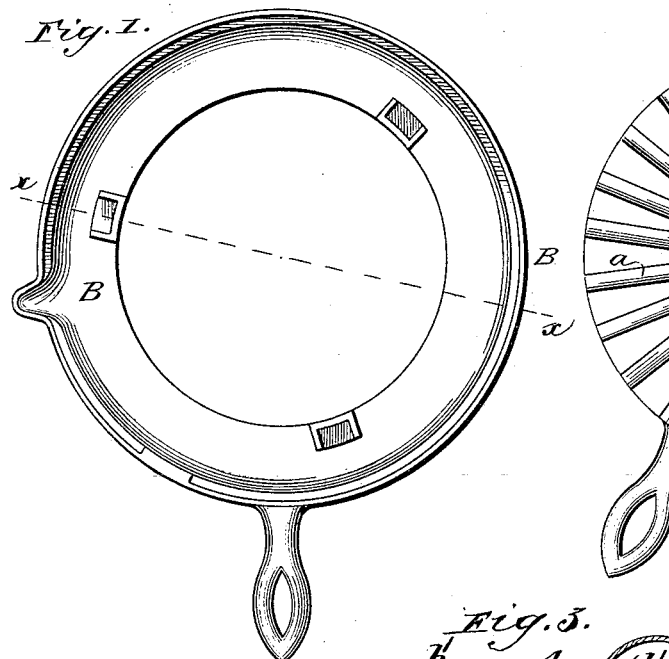
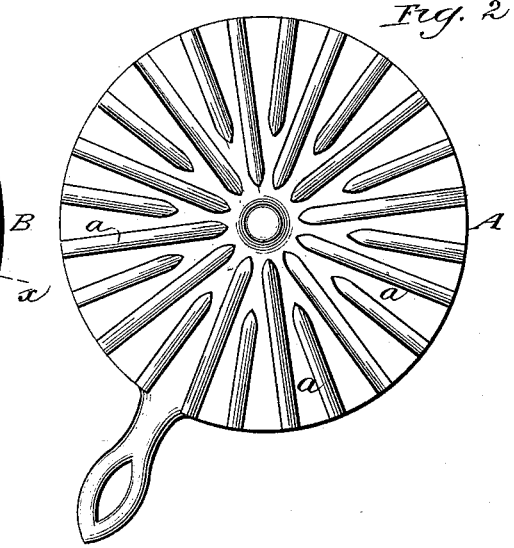
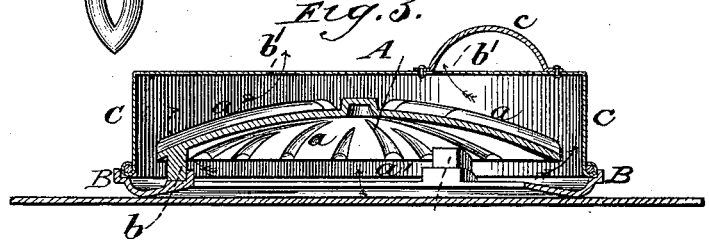
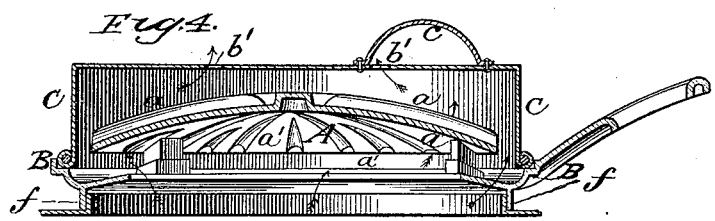
Witnesses
Inventor
Michael C Armour

UNITED STATES PATENT OFFICE.

MICHAEL C. ARMOUR, OF CHICAGO, ILLINOIS, ASSIGNOR TO GEORGE M. CLARK & COMPANY, OF SAME PLACE.

BROILER.

SPECIFICATION forming part of Letters Patent No. 403,407, dated May 14, 1889.

Application filed October 28, 1886. Serial No. 217,437. (No model.)

*To all whom it may concern:*

Be it known that I, MICHAEL C. ARMOUR, of Chicago, in the county of Cook and State of Illinois, have invented certain new and useful Improvements in Broilers, of which the following is a specification, reference being had to the accompanying drawings, and to the letters of reference marked thereon.

The object of my invention is to provide a broiler which will broil meats, &c., over gasoline, oil, gas, and other stoves, bringing the direct as well as the radiated heat in contact with the meat, and yet preventing the stove-top, burners, and other parts of the stove from becoming soiled by the drippings from the meat.

In carrying out my invention I use a solid metal meat-plate, a trough to catch the drippings, and passages for hot air, the hot air after passing under and about the meat-plate and meat being, in a measure, collected or temporarily confined above it and the meat until it (the air) escapes, the function of the meat-plate being to rapidly sear the meat on one side, while the hot air cooks it quickly and evenly on the other side, the gravy and drippings running down the plate and entering the trough, being thus prevented from falling upon the stove.

In the accompanying drawings, Figure 1 is a top view of the gravy-trough. Fig. 2 is a similar view of the meat-plate. Fig. 3 is a vertical section on the line $x\ x$ of Fig. 1, and also of the meat-plate, Fig. 2, showing it, together with the tin cover, in place. Fig. 4 shows the broiler of Figs. 1, 2, and 3 adapted to a turret or cylinder top oil-stove by the addition of a rim to keep it in place.

Similar letters of reference indicate similar parts in the respective figures.

Referring to Fig. 2, A is a solid curved and ribbed meat-plate, adapted to rest on the ring or gravy-trough B, Fig. 1. The meat-plate A and gravy-trough B are each provided with a handle. The plate A is provided with ribs $a$, concave on the under side and convex above, whereby the minimum of metal is used in the construction of the plate and it is rendered readily susceptible to the action of heat, and admits the passage of hot air between the meat-plate and the meat. The plate A has cast with it feet $b$, which rest upon the gravy-trough B, a space, $a'$, being left between the said plate and trough.

C is a tin cover resting upon the gravy-trough B. The cover is provided with openings $b'$, for the purpose of ventilation, and with a handle, $c$. The cover is also cut away or slotted at $c'$, to allow it to fit over the handles of the plate A and gravy-trough B, respectively.

Instead of the ribs $a$, it is evident that other devices may be used—as, for instance, square, round, or other shaped pins could cover the surface of the plate A, or a wire frame be used in such a way as to raise the meat from said plate.

The operation is as follows: When the broiler is placed over the top of a stove, the heat fills the under side of the plate A, and is then carried, as indicated by the arrows, between the trough B and plate A into the space under the cover C, and thence through its openings $b'$ to the outer air. The meat, resting upon the ribs $a$, or their equivalent, becomes thoroughly browned, while spaces for the free circulation of air are provided by the ribs between the plate and the meat. The hot plate A quickly sears the under side of the meat, while the hot air which fills the cover cooks it quickly and evenly on the top side, the drippings running into the trough.

In Fig. 4 the application of the invention to a turret or cylinder top oil-stove is shown, the construction of the invention being the same as in Fig. 3, except that an annular rim, $f$, is used to surround the flange of the stove-plate.

In both forms of the invention the operation is the same, the important feature being to provide a ribbed or similar plate upon which the meat shall rest, a space below for the passage of hot air from the stove under the broiler, and a space above the broiler which the air may enter, and in which it may be temporarily confined in contact with the upper surfaces of the meat before passing away from the device.

The plates A and trough B can be made of stamped metal or of cast-iron, the latter being preferred, and instead of the use of a handle for each, as shown in Figs. 1 and 2, the plate and trough may be fastened together and one handle used for both. However, I prefer to separate the two parts to facilitate cleaning.

Having described my invention, I claim—

1. The solid meat-plate A, having the feet $b$, combined with the trough B, the meat-plate being supported above the trough by the feet, whereby a space, $a'$, is formed, substantially as set forth.

2. The solid convex topped and ribbed meat-plate A, having the feet $b$, combined with the trough B, a space, $a'$, being left between the outer edge of the meat-plate and the trough, substantially as set forth.

3. The combination, with the cover C, of the solid meat-plate A, having the feet $b$ and the trough B, supporting said meat-plate, a space, $a'$, being formed between the meat-plate and trough, substantially as set forth.

In testimony whereof I hereunto set my hand and seal.

MICHAEL C. ARMOUR. [L. S.]

Witnesses:
JAS. A. MAHON,
RICHARD A. MILLIGAN.